J. A. MISLAND.
SUSPENSION FOR TRAIN LIGHTING DYNAMOS.
APPLICATION FILED SEPT. 29, 1909.
960,368.
Patented June 7, 1910.
2 SHEETS—SHEET 1.
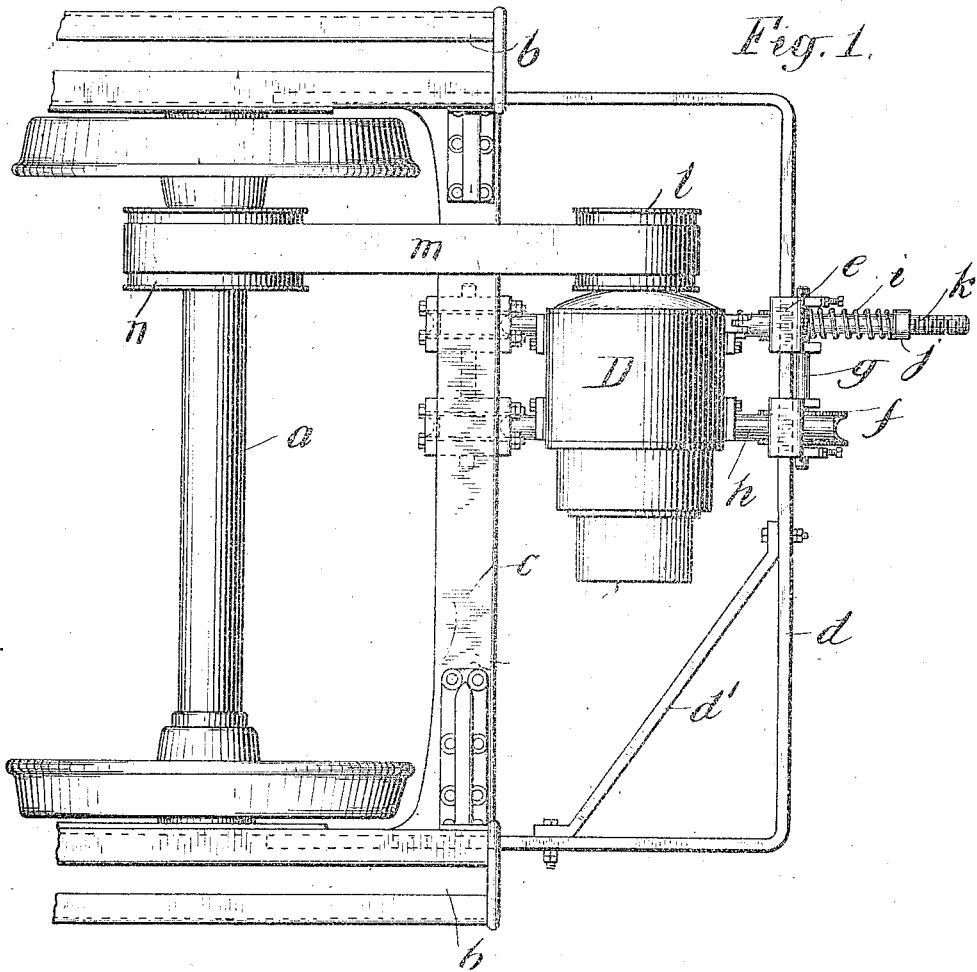
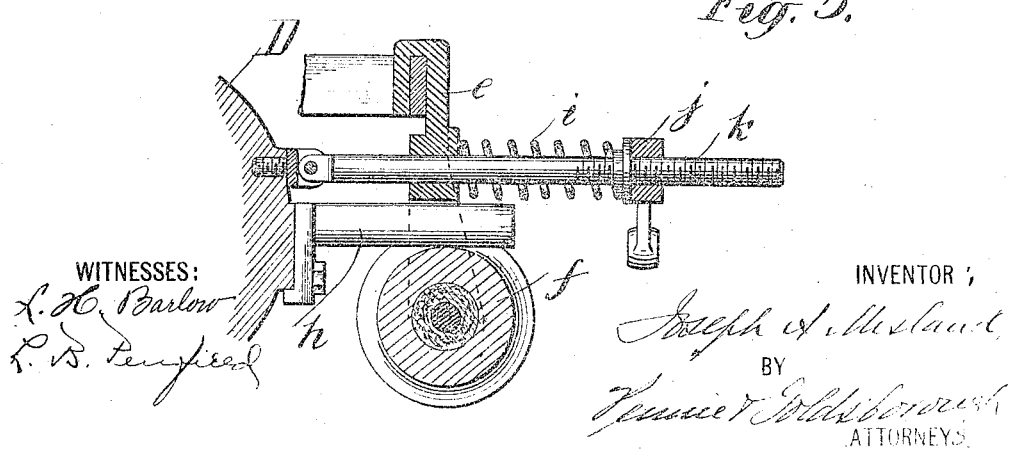

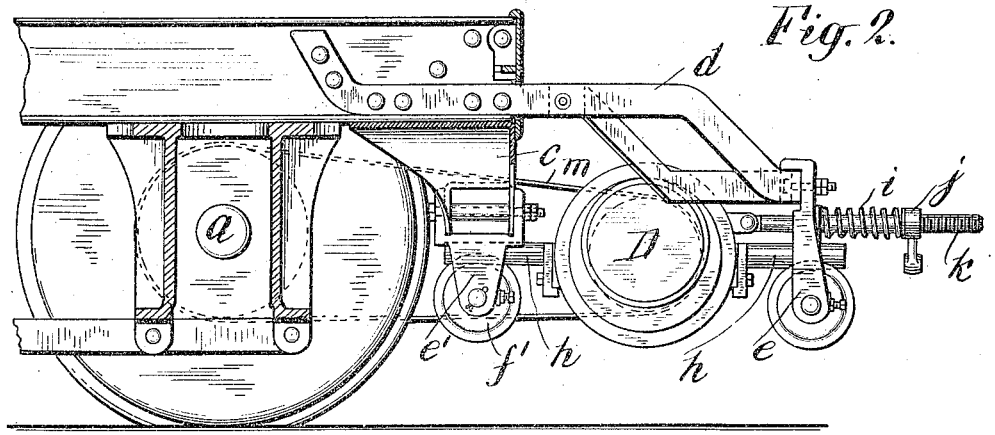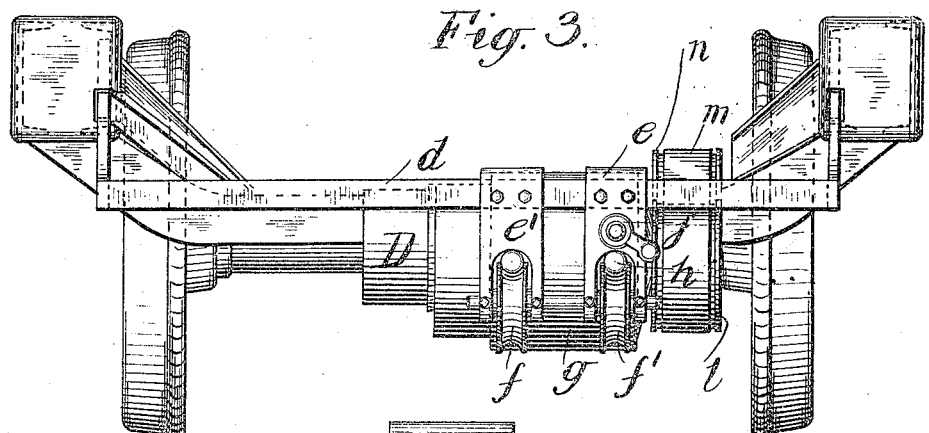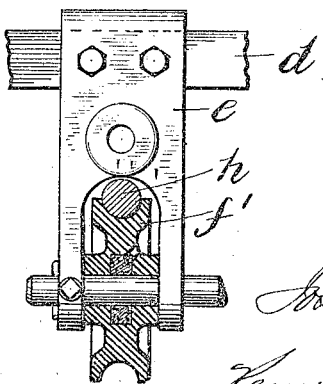

UNITED STATES PATENT OFFICE.

JOSEPH A. MISLAND, OF BAYONNE, NEW JERSEY.

SUSPENSION FOR TRAIN-LIGHTING DYNAMOS.

960,368.

Specification of Letters Patent. Patented June 7, 1910.

Application filed September 29, 1909. Serial No. 520,154.

*To all whom it may concern:*

Be it known that I, JOSEPH A. MISLAND, a citizen of the United States, residing at Bayonne, county of Hudson and State of New Jersey, have invented certain new and useful Improvements in Suspensions for Train-Lighting Dynamos; and I do hereby declare the following to be a full, clear, and exact description of the invention, such as will enable others skilled in the art to which it appertains to make and use the same.

The invention relates to the suspension of dynamos for car lighting systems, beneath the body of the car and outside of the truck frame, and in a manner such that the position of the dynamo with respect to the driving axle is yieldingly adjusted to maintain the driving connections taut.

The particular object of the invention is to provide such a suspension which will occupy a minimum of space while effectively performing its intended functions, and avoiding complication of parts.

The particular nature of the improvements will be understood from the following description and the accompanying drawings, in which—

Figure 1 is a plan of the outer end of a truck with the dynamo and its supporting frame; Fig. 2 is a side elevation of the same parts; Fig. 3 is an end elevation; Fig. 4 is an elevation, on a larger scale, of one of the suspension yokes for the rail-carrying sheaves, and Fig. 5 is a section through such support and its sheave showing the adjusting rod and spring.

The improved suspension is shown as applied to a steel truck of a standard construction, of which there is illustrated the axle $a$ and its wheels, the end portions of the side sills $b$, and the end sill $c$. To afford an outside support for the suspension mechanism, a bracket device or yoke $d$ strengthened by the corner brace $d'$ is bolted to side sill $b$ and extends rearwardly therefrom. Hung on the transverse portion of the bracket $d$ are a pair of suspension yokes $e$, each of which is forked at its lower end to straddle a sheave $f$, the two sheaves being shown as supported on a single shaft $g$ which passes through both suspension yokes, though obviously the sheaves might have individual shafts. From the end sill $c$ there are hung a second pair of suspension yokes $e'$ corresponding in position to the yokes $e$, and carrying the sheaves $f'$. The sheaves $f$ and $f'$ are intended to support and guide carrying-rails $h$ which, in the embodiment of the invention illustrated, are shown as conveniently formed in two pieces, bolted to the casing of the dynamo, as shown, and formed with a cylindrical outline to lie in the sheaves and move readily thereon.

The shaft of the dynamo carries a pulley $l$ driven by belt $m$ from driving pulley $n$ on axle $a$ and the belt is kept taut by the action of a belt-tightening spring $i$ compressed between one of the suspension yokes $e$ and a nut $j$, which can be adjusted along the guide rod $k$ to change the tension on the spring. In this manner it is possible to support a dynamo so that it will be automatically adjusted in position with respect to the driving axle to keep the driving connection taut, and at the same time will be supported well above the track and within an extremely small space. In fact, the employment of carrying rails extending laterally from the casing of the dynamo, whether made in two parts attached to opposite sides of the casing, or in a single piece encircling the casing, makes it possible to support the rails, and thereby the dynamo, on supporting rail-guides which need not extend at any point below the dynamo casing, so that the entire suspending mechanism by which the dynamo is hung from the end sill $a$ and the bracket $d$ is contained within the vertical limits of the dynamo itself.

Having thus described my invention, what I claim is:—

1. A car truck having a bracket device extending outside of the beams thereof, in combination with depending rail-supporting guides supported by the truck and bracket, and a dynamo having carrying-rails extending laterally from its casing slidably supported on the guides; substantially as described.

2. A car truck having a bracket device extending outside of the beams thereof, in combination with depending rail-supporting guides supported by the truck and bracket, a dynamo having carrying-rails extending laterally from its casing and slidably supported on the guides, a pulley on the shaft of the dynamo, a driving pulley on the axle of the truck, a driving belt extending between said pulleys, and a belt tightening spring connected to the dynamo to slide it away from the driving axle; substantially as described.

3. A car truck having a bracket device extending outside of the beams thereof, in combination with depending suspension yokes supported from the truck and bracket, rail-supporting guide sheaves journaled in said yokes, and a dynamo having carrying-rails extending laterally from its casing and slidably supported on the guide sheaves; substantially as described.

4. A car truck having a bracket device extending outside of the beams thereof, in combination with depending suspension yokes supported from the truck and bracket, rail-supporting guide sheaves journaled in said yokes, a dynamo having carrying-rails extending laterally from its casing and slidably supported on the guide sheaves, a pulley on the shaft of the dynamo, a driving pulley on the axle of the truck, a driving belt extending between said pulleys, and a belt-tightening spring connected to the dynamo to slide it away from the driving axle; substantially as described.

In testimony whereof I affix my signature, in presence of two witnesses.

JOSEPH A. MISLAND.

Witnesses:
    AUG. TREADWELL, Jr.,
    WALTER E. GREEN.